United States Patent [19]

Cole

[11] 4,010,347

[45] * Mar. 1, 1977

[54] COATED TUBULAR ELECTRODES

[75] Inventor: James Arlen Cole, El Monte, Calif.

[73] Assignee: Cabot Corporation, Kokomo, Ind.

[ * ] Notice: The portion of the term of this patent subsequent to July 8, 1992, has been disclaimed.

[22] Filed: Sept. 23, 1974

[21] Appl. No.: 508,521

[52] U.S. Cl. .............................. 219/146; 219/145
[51] Int. Cl.² .......................................... B23K 35/22
[58] Field of Search ............ 117/202; 219/76, 145, 219/146; 29/191.2, 191.6

[56] References Cited

UNITED STATES PATENTS

| | | | |
|---|---|---|---|
| 1,825,829 | 10/1931 | Stoody et al. ..................... | 219/145 |
| 3,592,999 | 7/1971 | Quaas .............................. | 219/146 |
| 3,711,019 | 1/1973 | Rulo ............................... | 117/202 X |
| 3,894,211 | 7/1975 | Young et al. ..................... | 219/146 |

Primary Examiner—Bruce A. Reynolds
Assistant Examiner—N. D. Herkamp
Attorney, Agent, or Firm—Buell, Blenko & Ziesenheim

[57] ABSTRACT

This invention relates to improved coated filled-tubular hard-surfacing electrodes and methods for manufacturing same. In the manufacture of electrodes of this invention, the ends of electrodes are sealed by dip coating in a liquid or slurry, similar to the flux coating composition.

6 Claims, 1 Drawing Figure

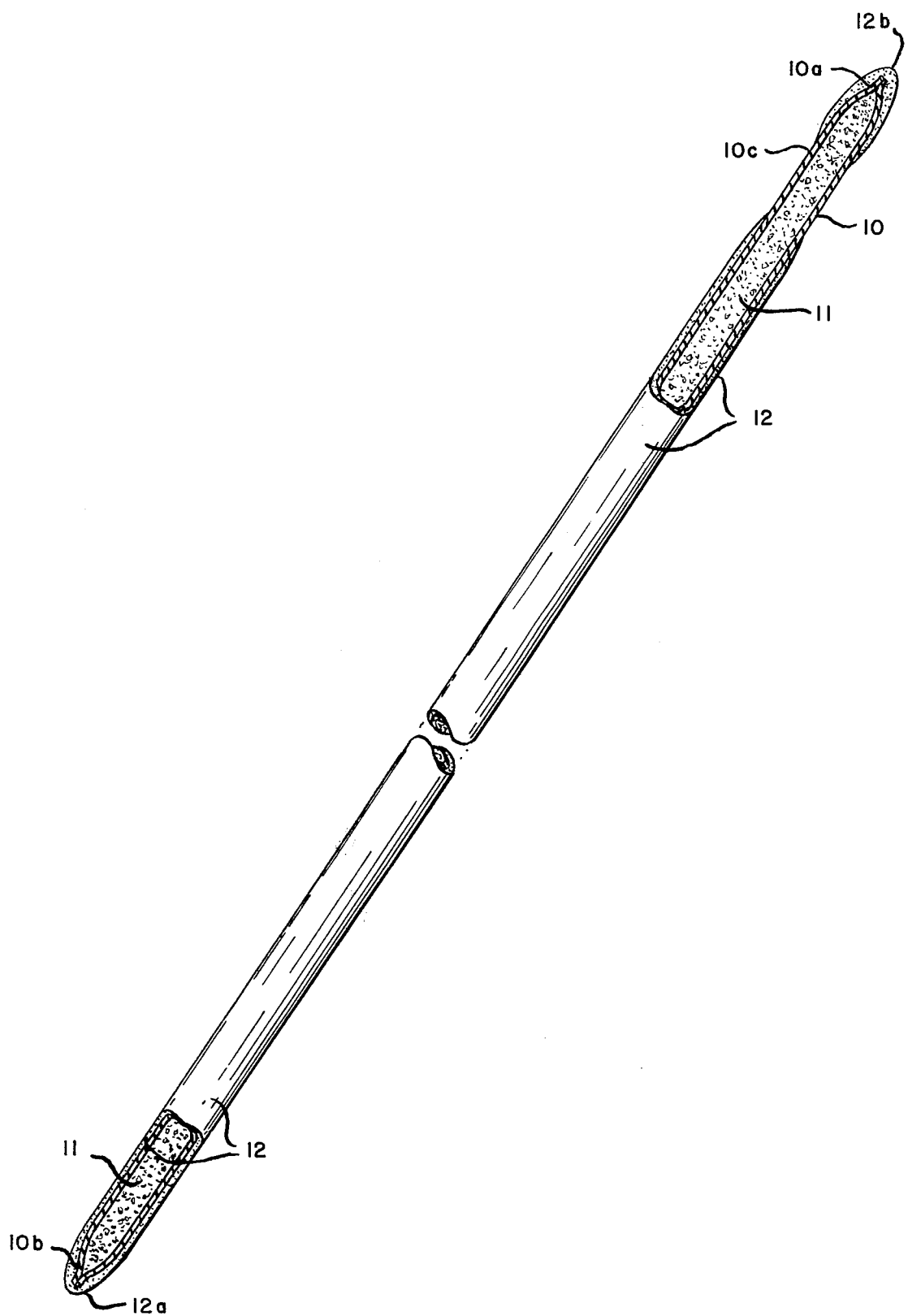

COATED TUBULAR ELECTRODES

This invention relates to coated tubular electrodes, and more specifically, to a flux coated filled-tubular welding electrode. To improve and/or restore abrasion- and/or wear-resistance to the surfaces of certain commercial articles, deposits of a metal matrix and particles of hard materials are co-deposited on the substrate article. One well known process for doing this is by welding with the use of coated filled tube electrodes. The hard particles may include one or more carbides or borides; for example, tungsten carbide and the like. The metal tube may consist of the metals or alloys of iron, cobalt, nickel, copper and the like. An example of one class of flux-coated tube electrode may be found disclosed in U.S. Pat. No. 3,592,999.

The bare filled tubes are manufactured by various processes and typically as disclosed in U.S. Pat. Nos. 1,629,748 and 1,671,384. The ends of the bare tubes are generally seald by means of welding, after the filling step and cutting step have been completed. The seal welding step is nominally done by an arc welding apparatus at both ends of the bare cut tubes. This operation is very expensive because of the high cost of welding, the individual handling of each tube to be seal welded and the use of costly energy in the form of electrical power. If gas welding is substituted for the arc welding step, then, of course, other energy sources are used in the form of compressed gases and a comparable expense is involved.

It is the principal object of this invention to provide coated filled electrodes at a lower cost and with the use of less energy than the practices heretofore followed in this art.

It is another object of this invention to eliminate the costly seal welding step in the manufacture of coated filled electrodes.

It is still another object of this invention to provide more economical coated filled electrodes with no reduction in the quality of the electrodes or the composition of the final deposit.

Other objects and features of this invention will be apparent from the following description and claims.

I have found that coated tubular electrodes may be prepared by the steps of filling a hollow tubular metal member with particles of hard material such as metal carbides, frictionally engaging the particles of hard material at each end of each tubular member by any suitable means such as pinching or reducing the cross section of the end to prevent spilling of the filler material from the hollow tube, coating the exterior of the electrode to the grip end and the open portion of the grip end with a slurry of coating material and drying the slurry in situ to coat the electrode and open portion of the grip end, whereby both ends are sealed by the dried slurry.

An electrode according to my invention is illustrated in the accompanying drawing in which a hollow tube 10 is filled with tungsten carbide particles 11. The ends 10a and 10b of tube 10 are pinched to frictionally engage carbide particles 11 to prevent spilling out of the ends. The electrode is dipped into slurry up to the grip end 10c to coat the electrode and to permit slurry to enter the pinched or crimped end of the tube and to enter the interstices between the carbide particles and dried to provide an outer coating 12 and an end seal 12a at one end. The other end at the grip end 10c is dipped to provide an end seal 12b while at the same time permitting the slurry to enter the pinched end and enter the interstices between the carbide particles. The rod is again dried and baked to fix the coating on the rod and in the ends.

A comparison of the steps of this invention with the prior art may be helpful in understanding this invention.

Sequence 1 presents a flow chart of the steps usually required in the prior art. Sequence 2 presents a flow chart of the steps of the present invention. Sequence 3 presents a flow chart of an optional version of the present invention.

Sequence 1 — Prior Art

I. Fill bare electrodes
II. Weld seal ends
III. Dip coat electrode in slurry
IV. Dry coated electrode
V. Bake coated electrode

Sequence 2 — This Invention

I. Fill bare hollow electrodes
II. Mechanically reducing the cross section of the two ends of each hollow electrode sufficient to frictionally hold the fill material
III. Dip coat electrode in slurry
IV. Dry coated electrode
V. Dip seal grip end in slurry
VI. Bake coated electrode

Sequence 3 — This Invention (Optional)

I. Fill bare hollow electrodes
II. Mechanically reducing the cross section of the two ends of each hollow electrode sufficient to frictionally hold the fill material
III. Dip seal grip end in slurry
IV. Dry grip end
V. Dip coat electrode in slurry
VI. Bake coated electrode Coatings may be applied on tubular filled electrodes by coating the bare electrode with a paste or slurry of a wide variety of compositions. The choice of coating composition depends principally upon the intended type of hardfacing to be down and the total composition of the tube and filler mixture. Many flux coating compositions are known in the art as described in U.S. Pat. Nos. 2,086,132; 2,435,198; 2,370,100; 2,700,091; or 3,592,999. The coating materials are specifically composed to serve as many functions as may be required; for example, the coating may serve as a slag former, flux deoxidizer, degasifier, alloying agent, provider of hard particles or many other functions. The electrodes of this invention are not limited to any specific composition of the coating or of the filler or of the metal tube.

Following the filling step in production, the ends of the rod are usually pinched or reduced in cross sectiion in some way to prevent the filler material from spilling out of the rod. Normally in the prior art at this stage both ends are "arc" sealed prior to the coating operation.

Coating of the bare filled rods may be done by manual or mechanical means. The coating is applied by means of dipping the rod into a slurry of the flux coating material. When withdrawn the rod will be coated with the flux coating material and the coating material will have entered the crimped or pinched end and entered into the interstices of the filler material. The rods are then permitted to dry preferably with the use of forced hot air within a chamber. The part of the rod that is held during the coating operation (called the grip end), is about one inch and generally is not coated. In the practice of my invention, however, the grip end is dipped in the coating slurry at its tip to coat the tip and permit the coating slurry to enter the interstices of the fill material. After baking the coating and the intersticial material hardened and lock the fill material in place.

It is contemplated as part of this invention that the order of the coating step and sealing step may be optionally reversed. This is described in the foregoing sequence descriptions. It is understood that dip sealing the grip end before the coating step will not affect the end product.

This invention eliminates the above mentioned welding step to seal the ends. Instead, according to the present invention, the filled rods are coated by means of a dipping step into a slurry thereby sealing the end of the coated portion of the filled rod. Following the drying step of the coated slurry, the grip end is sealed by means of another dip into a more shallow depth of similar slurry. Up to a minimum of about ¼ inch depth is usually sufficient. The depth of the seal dip may overlap the coating. However, only enough slurry coverage to seal the end is all that is really required. The slurry material is dried, preferably by means of forced hot air, and the coated filled electrode is baked as may be required as the final processing step.

EXAMPLE I

The following coating was prepared:

| Initial Mix | Percent by Weight |
|---|---|
| Graphite | 60 |
| Iron Powder | 10 |
| Sodium Silicate | 30 |

The initial mix was blended for a few minutes. Water was added at a ratio of 470 mls. water to 700 gms. of initial mix and the combined composition was further blended for a few minutes to yield a coating slurry. Several bare filled tube rods were coated by this coating slurry by dipping up to the grip end of rod as is commonly done. The coating was dried (pre-baked) at a temperature of 150° F. for 60 minutes.

The uncoated end (grip end) was also dipped into the same coating slurry and consequently air-dried at room temperature for 60 minutes.

Following the drying step, the coated filled electrode was final baked at 500° F. for 10 hours.

EXAMPLE II

A similar test was conducted as Example I except that the initial mix contained:

| Graphite | 70 wt/o |
|---|---|
| Sodium Silicate | 30 wt/o |

Water was added at a ratio of 500 mls. water to 700 gms. of initial mix.

EXAMPLE III

One batch of 1,400 pounds of filled rod was coated and sealed by the process of this invention using a proprietary composition of the flux coating slurry. The coating and sealing steps were completed in 20 minutes. When 1,400 pounds of filled rod are sealed by welding as the prior art standard practice, the welding and coating process normally takes 12 hours.

EXAMPLE IV

Similar tests were conducted as Example I except that the flux coating slurry consisted of a variety of several proprietary compositions. Each performed equally well.

EXAMPLE V

The coated filled electrodes as prepared by Examples I, II, III and IV were inspected for defects and found to be technically sound. The electrodes were tested in the standard welding practice to make hardfacing depositions. The following results were obtained in all cases:
1. The compositions wetted the rods effectively.
2. The sealants were electrically conductive.
3. Welding depositions were as good as the prior art method using welding as sealing means.
4. The overall quality of the electrodes was not affected in any way.
5. There was no effect in the shelf life of the electrode.

The results of the above mentioned examples have shown that any flux coating composition that may be used in practice is also suitable as a sealant material for the grip end.

Through additional experimentation, it was discovered that after the flux coating was applied, the slurry used as the grip end sealant may be optionally further diluted to a ratio of about one part water to three parts flux coating slurry. The exact proportion preferably should be determined in each case depending upon the thickness of sealant desired, the hardness and/or strength of the diluted slurry, the composition of the slurry and other considerations.

In the foregoing specification I have set out certain preferred embodiments and practices of my invention, however, it will be understood that this invention may be otherwise embodied within the scope of the following claims.

I claim:
1. A filled electrode comprising an elongated hollow metal tube, a particulate hard filler material filling the interior of said hollow metal tube, said metal tube being reduced in cross section and frictionally engaging said filler material at each end to prevent spilling, a dried slurry deposited coating covering a major portion of the exterior of one end of said tube and a minor portion of the other end of said tube, said major and minor coatings being spaced apart at said other end by an uncoated grip portion to be engaged by an electrode holder, said coatings filling the interstices of the filler material at both ends of said hollow tube.

2. A welding electrode according to claim 1 wherein the interstices of both ends of said electrode are filled by an essentially similar composition.

3. A method of producing flux-coated filled welding electrodes containing a coating portion and a grip end comprising the steps of:

a. providing a tubular rod filled with particulate material;
b. mechanically reducing the two ends of the tubular rod to frictionally engage the particulate material;
c. dip coating said coating portion of said rods in a slurry of coating material;
d. drying said coated portion;
e. dip sealing said grip end of said rods; and
f. drying and baking said rods.

4. A method according to claim 3 wherein an essentially similar slurry composition is used in steps *c* and *e*.

5. A method according to claim 3 wherein steps *c* and *e* are reversed in order.

6. A method according to claim 5 wherein an essentially similar slurry composition is used in steps *c* and *e*.

* * * * *